United States Patent
Okana et al.

(12) 
(10) Patent No.: US 6,561,563 B2
(45) Date of Patent: May 13, 2003

(54) FRONT BODY STRUCTURE FOR VEHICLE BODIES

(75) Inventors: Fumio Okana, Hiroshima (JP); Hayatsugu Harasaki, Hiroshima (JP)

(73) Assignee: Mazda Motor Corporation (JP)

( * ) Notice: Subject to any disclaimer, the term of this patent is extended or adjusted under 35 U.S.C. 154(b) by 0 days.

(21) Appl. No.: 09/858,869

(22) Filed: May 17, 2001

(65) Prior Publication Data

US 2002/0050726 A1 May 2, 2002

(30) Foreign Application Priority Data

May 17, 2000 (JP) ........................................ 2000-145365

(51) Int. Cl.⁷ ............................................. B62D 25/04
(52) U.S. Cl. ............................. 296/70; 296/72; 180/90
(58) Field of Search ........................ 296/70, 72, 203.02; 280/779; 180/90

(56) References Cited

U.S. PATENT DOCUMENTS

| | | | | |
|---|---|---|---|---|
| 4,709,943 A | * | 12/1987 | Yoshimura et al. | 180/90 |
| 5,201,566 A | * | 4/1993 | Mori | 296/192 |
| 5,230,530 A | | 7/1993 | Iriyama et al. | |
| 5,271,687 A | * | 12/1993 | Holka et al. | 296/203.01 |
| 5,549,344 A | * | 8/1996 | Nishijima et al. | 180/90 |
| 5,549,352 A | * | 8/1996 | Janotik et al. | 296/203.01 |
| 5,586,799 A | * | 12/1996 | Kanemitsu et al. | 296/188 |
| 5,639,116 A | * | 6/1997 | Shimizu et al. | 180/90 |
| 5,678,877 A | * | 10/1997 | Nishijima et al. | 180/90 |
| 5,685,595 A | * | 11/1997 | Nishijima et al. | 180/90 |
| 5,931,520 A | | 8/1999 | Seksaria et al. | |
| 5,979,965 A | * | 11/1999 | Nishijima et al. | 180/90 |
| 6,092,840 A | * | 7/2000 | Sugawara | 280/779 |
| 6,276,740 B1 | * | 8/2001 | Mellor et al. | 280/90 |
| 6,325,440 B1 | * | 12/2001 | Emmerich | 180/90 |

FOREIGN PATENT DOCUMENTS

| | | |
|---|---|---|
| DE | 186 18 626 | 11/1997 |
| DE | 198 30 303 | 1/2000 |
| EP | 0 990 578 | 4/2000 |
| JP | 10-218017 A | 8/1998 |
| JP | 11-235963 A | 8/1999 |

\* cited by examiner

Primary Examiner—D. Glenn Dayoan
Assistant Examiner—Patricia L. Engle
(74) Attorney, Agent, or Firm—Nixon Peabody LLP; Donald R. Studebaker

(57) ABSTRACT

A light-weighted and high rigidity front body structure for vehicle bodies. The front body structure comprises a transverse dash panel member extending over and welded to a dash panel or another member close to the dash panel and a transverse instrument panel member extending in the close vicinity of the dash panel. The instrument panel member, which is preferably formed from a pipe by hydro-forming, has opposite end portions welded to opposite side panels of the front body, respectively, and a generally U-shaped central portion opening upward and welded to a floor panel at a bottom thereof.

11 Claims, 7 Drawing Sheets

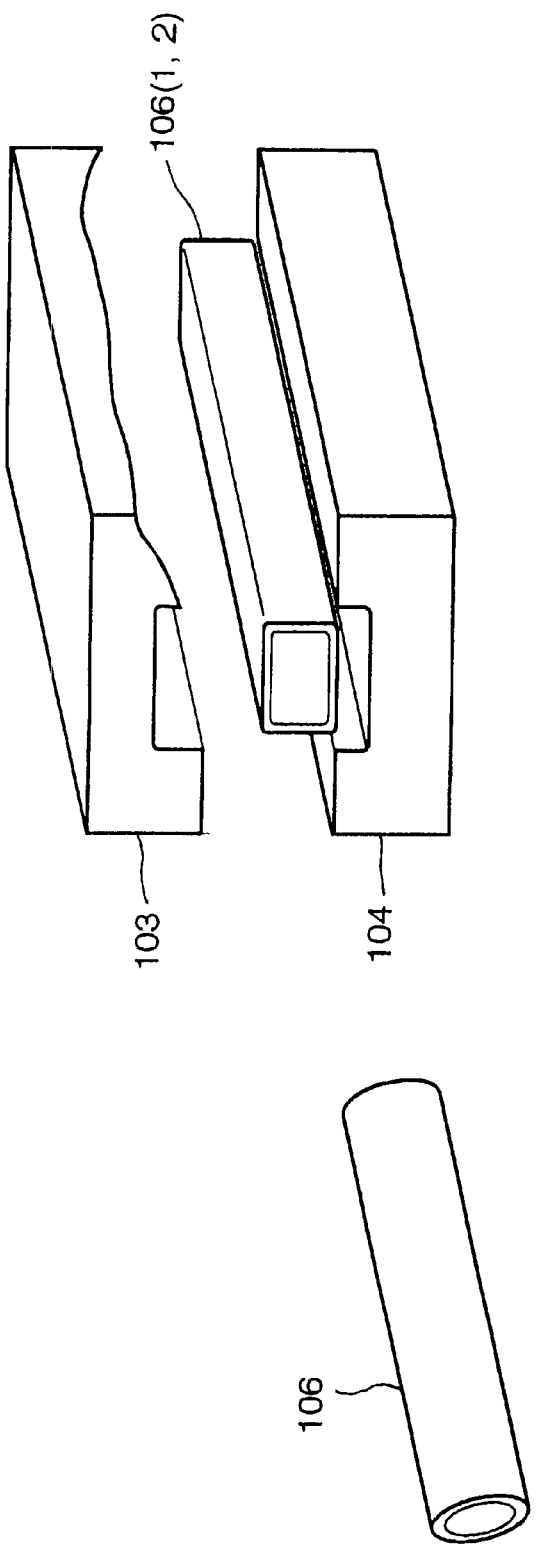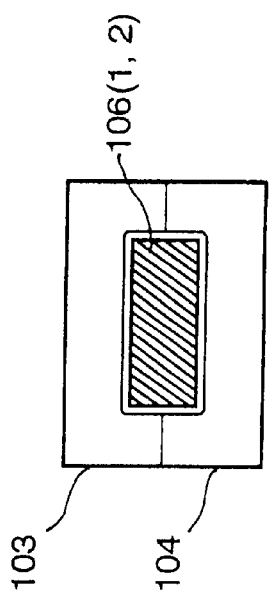

FRONT BODY STRUCTURE FOR VEHICLE BODIES

BACKGROUND OF THE INVENTION

1. Field of the Invention

The present invention relates to a body structure for vehicle bodies, and in particular to a front body structure forming a front portion of a passenger compartment for automobiles that are one of typical vehicles.

2. Description of Related Art

Recently various kinds of so-called hydro-forming have been proposed as one type of methods of forming metal members in the automobile industries. Hydro-forming is a molding or forming method to form a high tensile strength steel pipe to a given shape. The pipe member is placed in a die cavity and filled with a fluid such as water or oil. The pipe member is expanded by pressurizing the fluid until the pipe member is deformed to an external shape reflecting the contour of the die cavity. Such hydro-forming is known from, for example, Japanese a Unexamined Patent Publications Nos. 10-218017 and 11-235963 as applied to forming a reinforcement having a rectangular closed cross-section for a side sill or a center pillar of a vehicle body. In the hydro-forming, a pipe member for a reinforcement of a side sill is placed between upper and lower dies between which a cavity having a contour identical to an external shape of the reinforcement is formed, and then, pressurizing fluid is introduced into the pipe member so as to expand the pipe member until the pipe member is deformed to a shape reflecting the given contour of the cavity. The reinforcement thus formed is put in a follow side frame of a vehicle body and welding to the side frame. According to another example, a reinforcement having a rectangular closed cross-section, which is used to reinforce a center pillar extending downward from a roof side rail, is formed from a pipe member by the hydro-forming. The reinforcement is put in an internal space of the center pillar comprising a center pillar outer and a center pillar outer.

The hydro-forming can provides a pipe member with any external shape according to the given contour of the die cavity. By using this technology it becomes possible to obtain more lightened but more rigid structural members having various desired shapes as compared with similar members that are made by welding a plurality of stamped steel plates.

Generally a cowl structure located in front of a cabin or passenger compartment of an automobile that is a typical one of vehicles is an important structural part for safety because the cowl structure is not only contributory to ensure a body rigidity but also works as a base which mounts thereon a steering shaft and an air-bag that require high-accuracy and delicate adjustment in fitting position. However, the cowl structure needs a large number of parts that are usually complicated in shape, so that many restraints are put on designing and assembling the parts. Although, it is desirable to form the cowl structure from a reduced number of parts formed by the hydro-forming in light of simplifying assembling the parts to a cowl structure, nevertheless, a more reliable structure is needed because the cowl structure is of very importance in the terms of sufficient rigidity and safety of the vehicle body.

SUMMARY OF THE INVENTION

An object of the present invention is to provide a front body structure for vehicles which provides the front body with light weight and high rigidity.

The above object of the present invention is accomplished by a front body structure that comprises a dash panel separating a cabin or passenger compartment from the remaining part of a vehicle body, a dash panel member extending in a transverse direction of the vehicle body which is welded to the dash panel or another member disposed in the close vicinity of the dash panel, and an instrument panel member extending in the transverse direction in the close vicinity of the dash panel and supported at opposite ends thereof by side panels. The dash panel member and/or the instrument panel member are formed from a hollow pipe formed by hydro-forming. Each of the dash panel member and the instrument panel member has opposite ends welded to the side panels of the vehicle body, respectively.

According to the preferred embodiment of the present invention, a pipe member as the instrument panel member has opposite ends welded to the side panels having door openings, respectively, and a generally U-shaped central portion opening upward and welded to a floor panel at a bottom thereof.

According to another preferred embodiment of the present invention, a pipe member formed as the dash panel member has opposite end portions, each of which extends downward on the inner wall of the side panel along the door opening so that the end of the dash panel member is welded to the dash panel member in the close vicinity of the side panel, and a pipe member formed as the instrument panel member has opposite ends welded to the dash panel member in the close vicinity of the side panels and a generally U-shape central portion opening upward and welded to the floor panel at a bottom thereof.

The instrument panel member may be provided with brackets welded thereto for mounting a steering shaft and an air-bag on a passengers seat side on an intermediate portion of the instrument panel member between the generally U-shape central portion and one of the opposite ends of the instrument panel member on the passenger seat side. Further, the dash panel member may be provided with a cowl member extending in the transverse direction of the vehicle body and having a closed cross-section.

The front body structure of the present invention, including at least one of the dash panel member and the instrument panel member which are formed from a pipe member by hydro-forming, is comprised by an decreased number of parts by spot-welding them at a reduced number of points. This provides the front body with lighter weight and higher structural rigidity as compared with prior art front bodies. In consequent, the front body structure realizes firm and reliable installation of brackets for mounting steering shaft and an air-bag to one of the intermediate portions of the instrument panel member.

The front body structure of the present invention, including the dash panel member formed from a pipe member which as the end portion extending downward along the door opening of the side panels and welded to the side sill, provides a wide area for welding. This wide area of welding provides the front body with high structural rigidity.

The front body structure of the present invention, including the dash panel member and the instrument panel member formed from pipe members, respectively, which are welded to the inner wall of the vehicle body, improves the structural rigidity of the vehicle body and provides a light weighted front body due to a reduced number of parts.

Furthermore, the front body structure of the present invention, including the dash panel member formed from a pipe member ensures a sufficient structural rigidity of the front body. This increases the degree of designing a cowl structure because the dash panel member formed from a pipe member provides the front body with a high rigidity.

BRIEF DESCRIPTION OF DRAWINGS

The foregoing and other objects and features of the present invention will become more apparent from the following description in connection with the preferred embodiments thereof when considering in conjunction with the accompanying drawings, in which:

FIG. 8 is an illustration explaining a process of forming a structural member from a pipe member by hydro-forming; and FIG. 9 is a cross sectional view showing an object member deformed in a die cavity by hydro-forming.

DETAILED DESCRIPTION OF THE INVENTION

Figure 1:
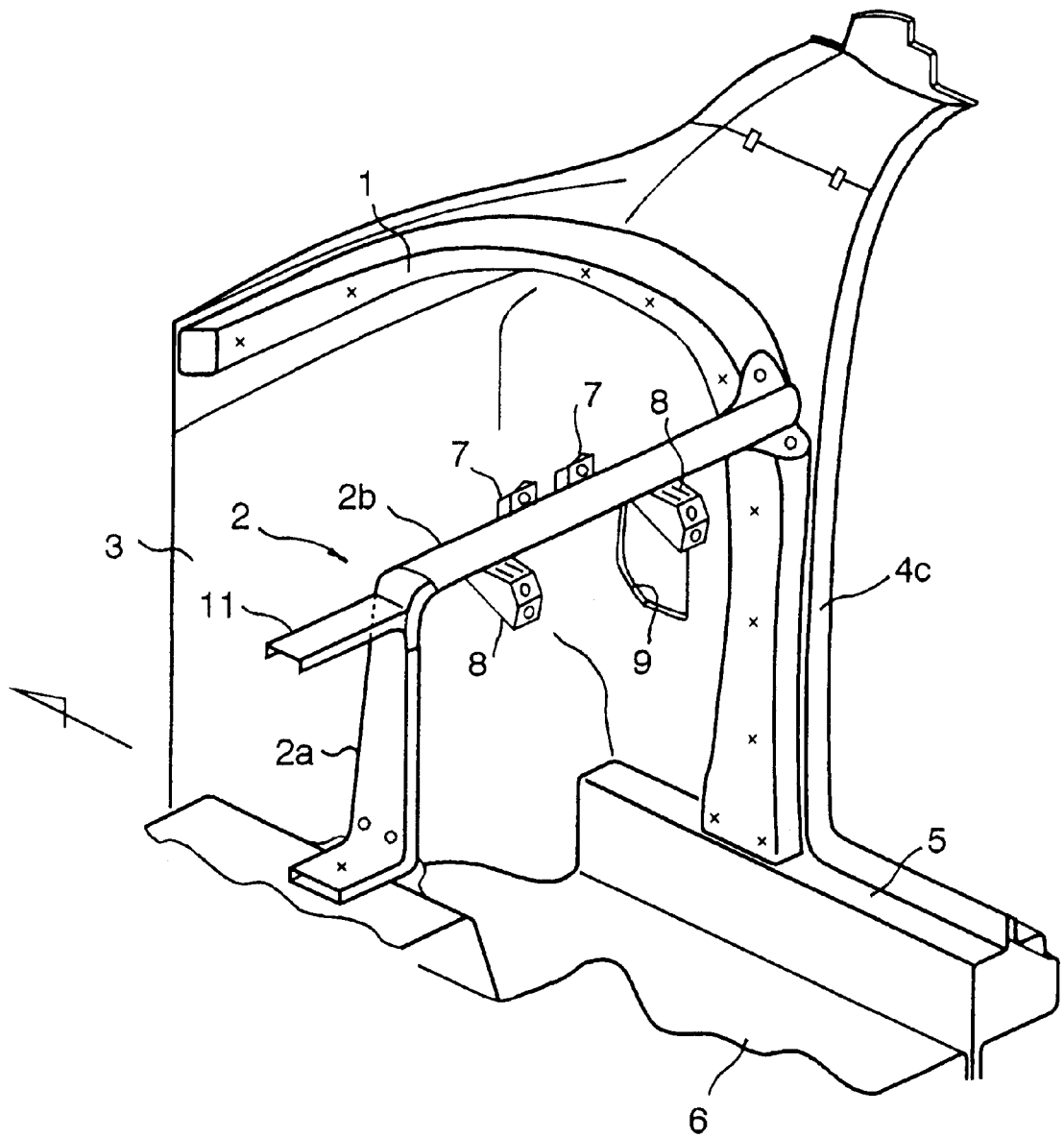
FIG. 1 is a perspective view showing a front body structure of a cabin or passenger compartment of a vehicle body at a passenger seat side in accordance with a preferred embodiment of the present invention.
Figure 2:
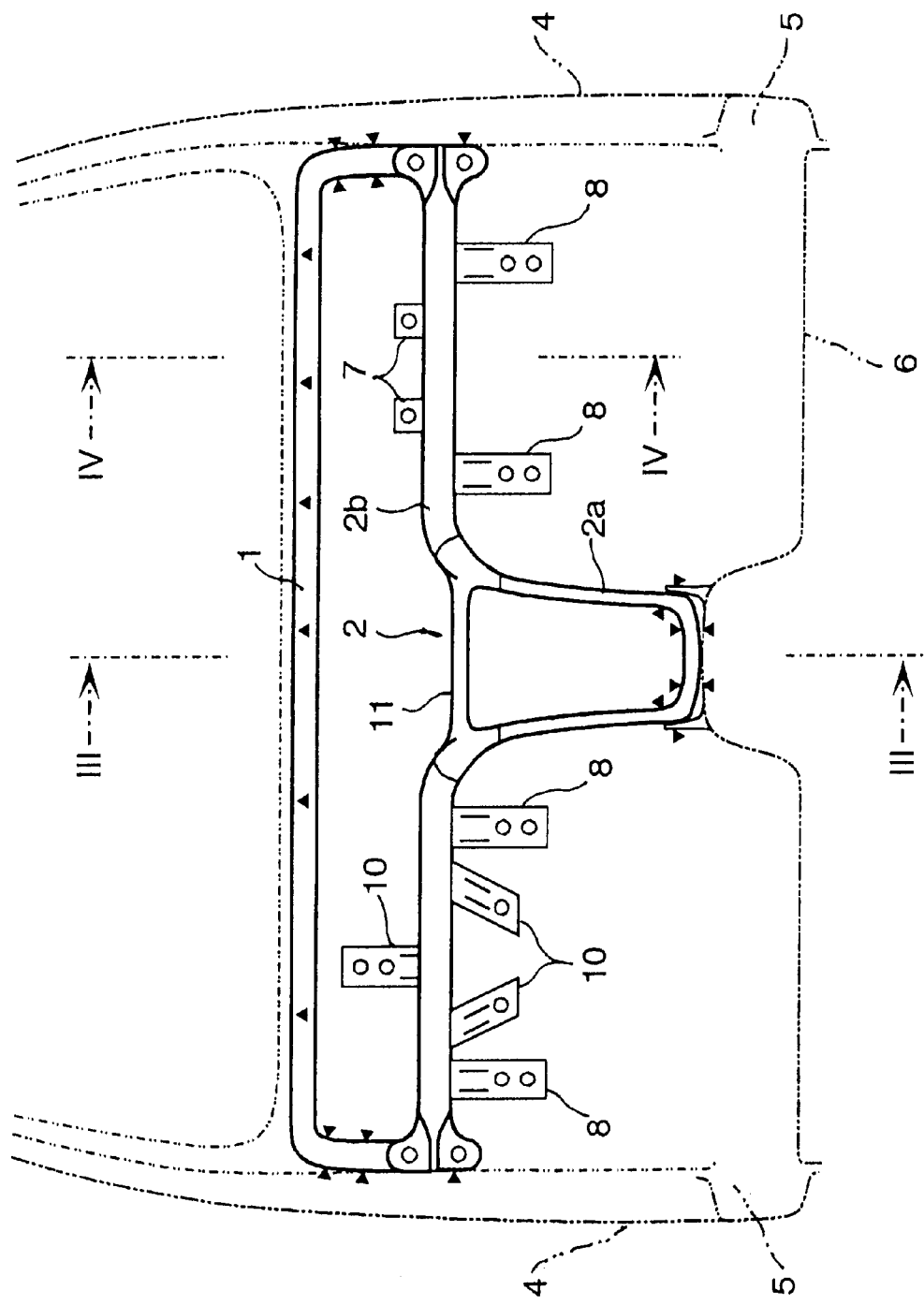
FIG. 2 is front view of the front body structure.

Referring to the drawings in detail, and in particular to FIGS. 1 and 2 showing a body structure of a front portion of a passenger compartment according to a preferred embodiment of the invention. In FIG. 1 the front body structure is depicted at a side of a passenger seat. In FIG. 2 the front body structure is depicted as viewed from the front of the vehicle body. Various points of the front body for spot welding are marked with a cross (X) in FIG. 1 and with a black triangle (Δ) in FIG. 2.

A dash panel member 1 that is formed from a pipe member extends in a transverse direction of the vehicle body (not shown) and is welded to an upper portion of a dash panel separating a cabin or passenger compartment from an engine room. Each of opposite ends of the dash panel member 1 is bent so as to extend rearward along an inner wall of side panels 4 and then downward to a side sill 5 along a rim 4c forming a door opening in the side panel 4. The dash panel member 1 is spot-welded to the side panel 4 at a number of appropriate points. This structure in which the dash panel member 1 is welded in a wide area to a side structure of the front body including the side panel 4 and the side sill 5 leads to improvement of structural rigidity of the vehicle body. An instrument panel member 2 that is formed from a pipe member extends in the transverse direction and is welded at opposite ends to the dash panel member 1 in the vicinity of the side panels 4. As shown in FIG. 2 the instrument panel member 2 has a generally U-shaped central portion 2b opening upward and opposite side portions 2a. Each side portion 2a of the instrument panel member 2 is welded to a floor panel 6 at several points. A reinforcement member 11 extends in the transverse direction and is welded, or otherwise secured, to upper end of the U-shaped central portion 2b as a reinforcing bridge.

This front body structure of the above embodiment reduces the number of structural parts and the number of welding points, which leads to a reduction in body weight and provides a high rigid front body with higher torsion-resistance as compared to conventional front body structures.

There are provided in the passenger compartment a bracket 7 mounting an air-bag (not shown) for a passenger, a bracket 8 securing an instrument panel (not shown) and a bracket 10 supporting a steering shaft are secured to the U-shaped central portion 2b of the instrument panel member 2. As the dash panel member 1 and the instrument panel member 2 have high rigidity as described above, the front body structure provides the reliable installation of the steering shaft and the air-bag through the brackets 7, 8 and 10 which requires delicate adjustment and high installing accuracy. This structure guarantees the safety of the vehicle body.

The dash panel member 1 and the instrument panel member 2 are formed from a high tensile strength steel pipe by using a hydro-forming technology. A cowl member (not shown in FIG. 1 and FIG. 2) is welded, or otherwise secured, to the dash panel member 1.

Figure 3:
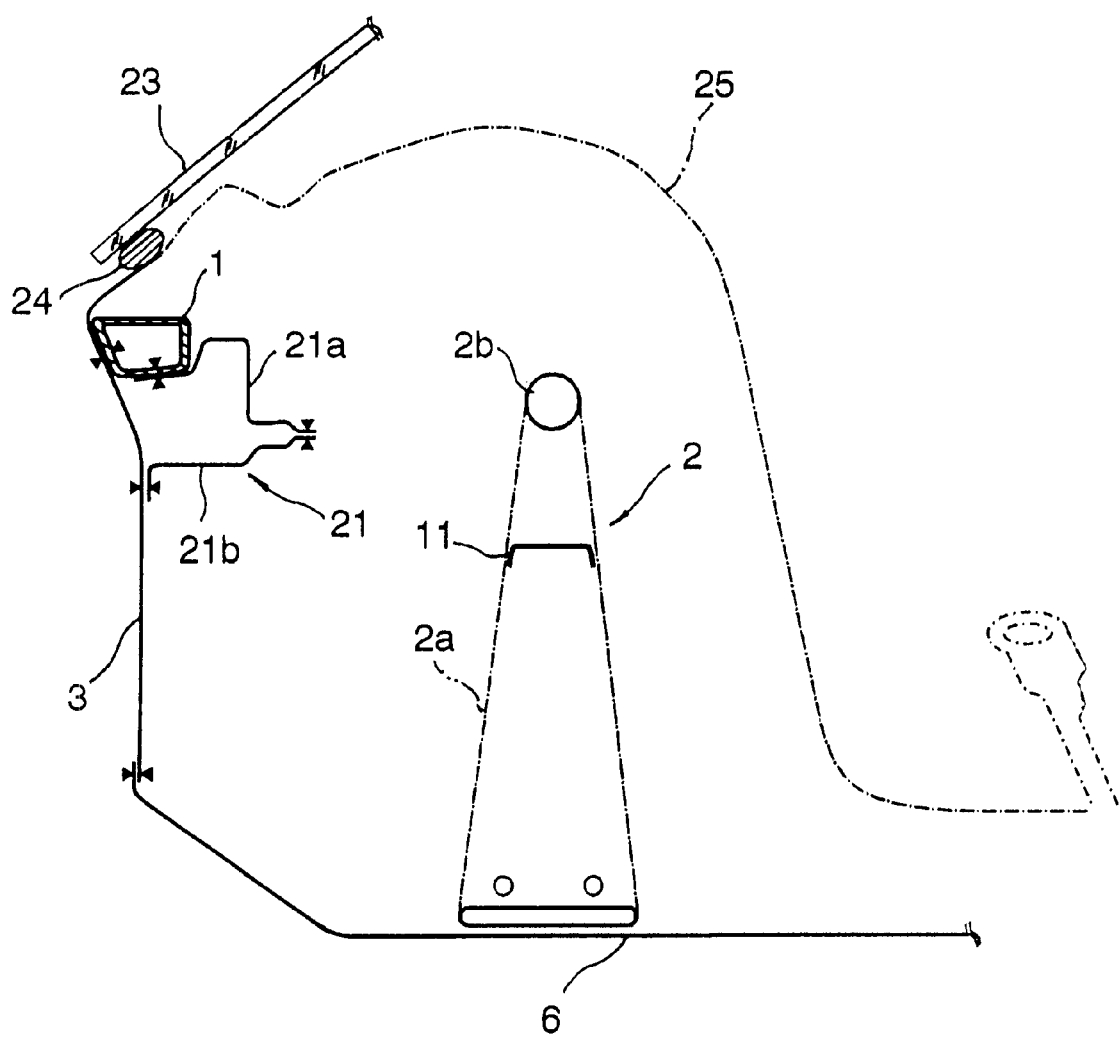
FIG. 3 is a cross-sectional view taken along line III—III of FIG. 2.
Figure 4:
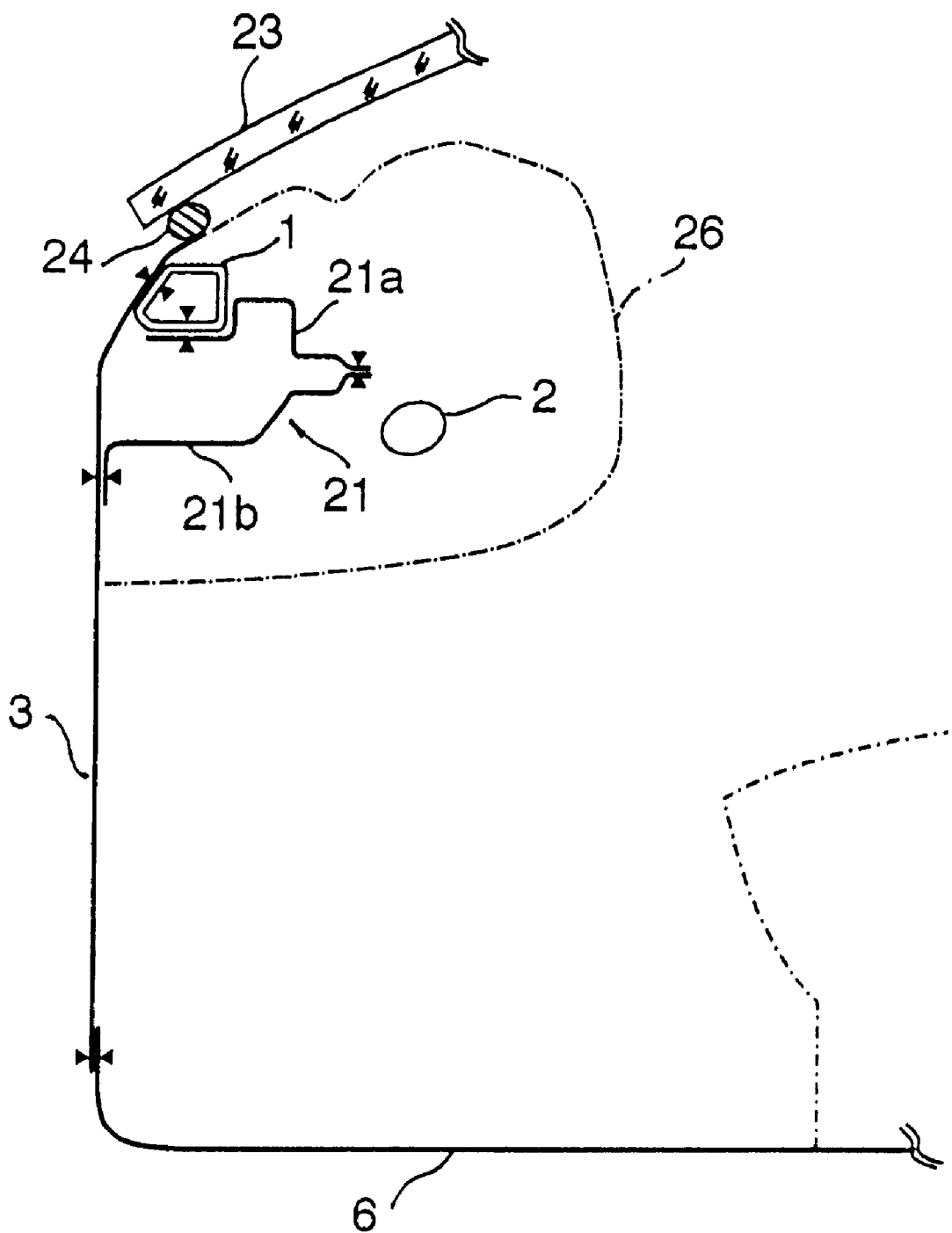
FIG. 4 is a cross-sectional view taken along line IV—IV of FIG. 2.

The following description is directed to the front body structure including the cowl member with reference to FIGS. 3 and 4 which are cross sectional views taken along lines III—III and IV—IV of the FIG. 2, respectively.

As shown in FIGS. 3 and 4, the dash panel member 1 is welded, or otherwise secured, to the upper part of the dash panel 3. A cowl 21, which comprises two parts, namely a cowl upper 21a and a cowl lower 21b, is welded to lower part of the dash panel member 1. The floor panel 6 at a front edge portion thereof is welded, or otherwise secured, to the lower part of the dash panel 3. At completion of assembling the vehicle body, a front windshield 23 is installed above the upper portion of the dash panel 3 through a seal 24 disposed therebetween. The U-shaped central portion 2b of the instrument panel member 2 is located in the inside of a center consol 25 depicted by a dotted line in FIG. 3. The transverse portion 2a of the instrument panel member 2 at the side of the passenger seat is located in the inside of a dashboard 26 depicted by a dotted line in FIG. 4.

The instrument panel member 2 has the U-shaped central portion 2b as described above. The U-shaped central portion 2b is such as to become wider as it comes down toward the floor panel 6. This change in width is suitable for having the instrument panel member 2 fixed firmly to the floor panel 6. Even though the instrument panel member 2 has such a complicated configuration, it can be made from a single member such as a high tensile strength steel pipe by using hydro-forming.

Figure 5:
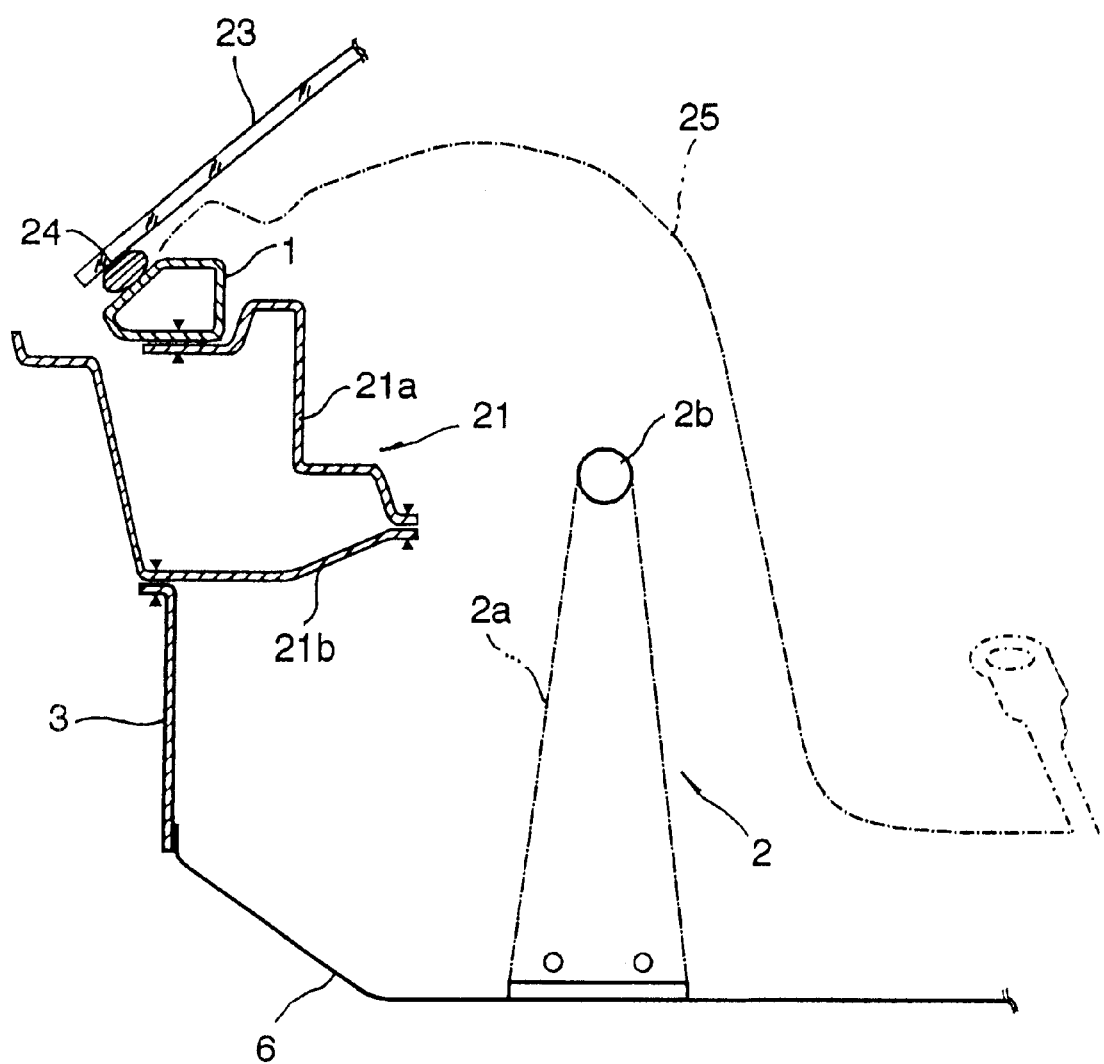
FIG. 5 is a cross-sectional view taken along line III—III of FIG. 2, which shows a cowl different from a cowl shown in FIGS. 3 and 4.

The cowl upper 21a, which is welded to the dash panel member 1, and the cowl lower 21b are not limited to the cross section shown in FIGS. 3 and 4, but can have a variety of cross sections such as shown in FIG. 5 by way of example.

FIG. 5 is a cross sectional view taken along line III—III of FIG. 2. As shown in FIG. 5, the cowl 21 comprises a cowl upper 21a and a cowl lower 21b. However, different from the cowl 21 shown in FIG. 3, upper end portion of the dash panel 3 is welded to the cowl lower 21b in the vicinity of the dash panel member 1. Although, in FIGS. 3 to 5, the cowl upper 21a at a front end portion is welded to the under side of the dash panel member 1, the upper cowl 21a at the front end portion may be welded to the side of the dash panel member 1. The structural configuration in which the cowl 21 is partly welded to the dash panel member 1 can take various forms in accordance with body configurations and/or purposes of vehicles. In any cases, the degree of designing the structure of a cowl and its associated parts is increased because the dash panel member 1 made of a pipe member provides a simple structure and insures high rigidity of the front portion of the cabin.

Figure 6:
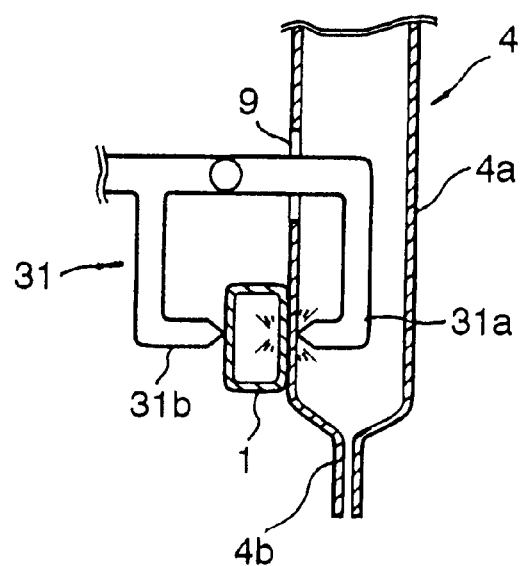
FIG. 6 is an explanatory view showing a process of welding a dash panel member to a side panel by spot-welding.

FIG. 6 is an explanatory view showing how to weld the dash panel member 1 to the side panel 4. A spot welding gun 31, specifically one 31a of a welding heads, is inserted into the inside of the side panel 4 (which comprises a side panel outer 4a and a side panel inner 4b) through an access opening 9 formed in the side panel inner 4b so as to hold the dash panel member 1 and the side panel inner 4b between the welding heads 31a and 31b for so-called indirect welding or hollow-body spot welding.

In this instance, the dash panel member 1 and the instrument panel member 2 are formed by hydro-forming as described below with reference to FIGS. 7 to 9.

Figure 7:
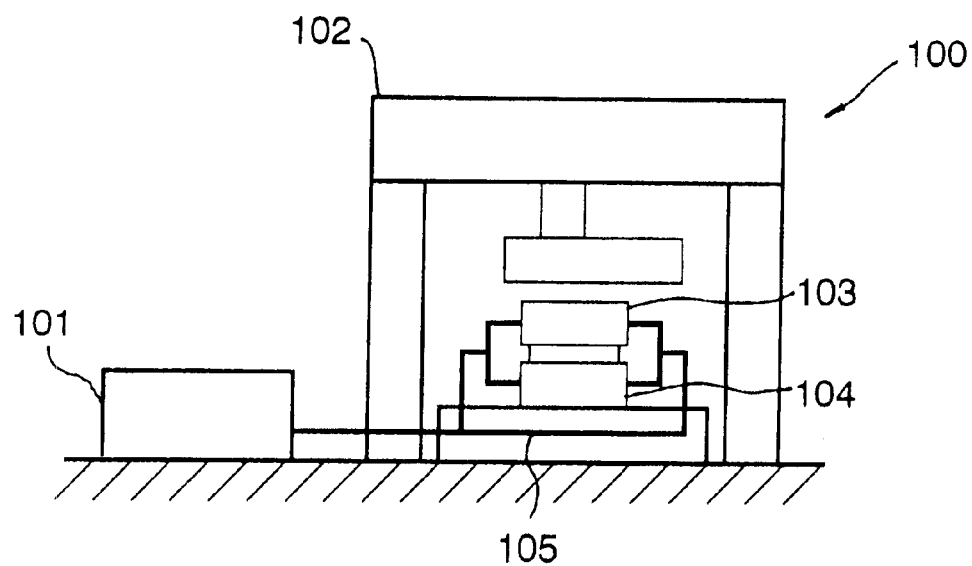
FIG. 7 is an explanatory view illustrating a hydro-forming machine which can be applied to forming a structural member such as a dash panel member and a instrument panel member.

FIG. 7 diagrammatically shows a hydro-forming machine 100 which is employed in the instant embodiment. FIGS. 8 and 9 diagrammatically show a method of hydro-forming the dash panel member 1 and the instrument panel member 2. The hydro-forming machine 100 includes an upper half die 103 and a lower half die 104, These upper and lower half dies 103 and 104 are finished in a given configuration identical to an object member, i.e. the dash panel member 1 or the instrument panel member 2. The upper and lower half dies 103 and 104 are placed under a hydraulic press 102 connected to a hydraulic unit 101 through an oil line 105.

As shown in FIG. 8, a high tensile strength steel pipe 106 is placed between the upper half die 103 and the lower half die 104. Then, while pressing the upper and lower half dies 103 and 104 against each other by the hydraulic press 102 (as shown in FIG. 7), an oil is filled in the pipe 106 from the hydraulic unit 101 through the oil line 105 as shaded in FIG. 9 and pressurized by the hydraulic unit 101. As a result, the pipe 106 is expanded until it grows into the shape of die cavity formed between the upper and lower half dies 103 and 104. In this manner, a given external configuration of the dash panel member 1 or the instrument panel member 2 is gained.

Although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A front body structure for vehicle bodies comprising:
   a dash panel separating a passenger compartment from remaining part of the vehicle body, said dash panel being provided with a cowl upper and a cowl lower secured to said dash panel so as to form a cowl having a closed cross section;
   a dash panel member extending in a transverse direction of the vehicle body and secured to both said cowl upper and said dash panel;
   a side panel forming each of opposite sides of said passenger compartment, said side panel being formed with a door opening; and
   an instrument panel member extending in said transverse direction in the close vicinity of said dash panel, said instrument panel member having opposite ends welded to said side panels, respectively,
   wherein said dash panel member is formed of a single piece of pipe member having opposite end portions, said single piece of pipe member being welded to said cowl and said side panels at a major portion thereof and welded to side sills at said opposite end portions, respectively.

2. The front body structure for vehicle bodies as defined in claim 1, wherein said instrument panel member is formed from a pipe member such as to have a generally U-shaped central portion opening upward and secured to a floor of a vehicle body at a bottom thereof.

3. A front body structure for vehicle bodies as defined in claim 1, wherein said instrument panel member is formed from a pipe member and has opposite ends welded to said dash panel member near said side panels, respectively, and a generally U-shaped central portion opening upward and secured to said floor panel at a bottom thereof.

4. A body structure for vehicle bodies as defined in claim 2, and further comprising a bracket for mounting a steering shaft to said instrument panel member, said bracket being welded to an intermediate portion of said instrument panel member between one of said opposite ends and said generally U-shaped central portion.

5. A body structure for vehicles as defined in claim 2, and further comprising a bracket for mounting an air-bag to said instrument panel member, said bracket being welded to an intermediate portion of said instrument panel member between one of said opposite ends and said generally U-shaped central portion.

6. A front body structure for vehicle bodies as defined in claim 1, and further comprising a cowl member extended in said transverse direction and having a closed cross-section, said cowl member being welded to said dash panel member.

7. A front body structure for vehicle bodies as defined in claim 2, and further comprising a cowl member extended in said transverse direction and having a closed cross-section, said cowl member being welded to said dash panel member.

8. A front body structure for vehicle bodies as defined in claim 1, wherein said dash panel member is formed by hydro-forming.

9. A front body structure for vehicle bodies as defined in claim 1, wherein said instrument panel member is formed by hydro-forming.

10. A front body structure for vehicle bodies as defined in claim 2, wherein said dash panel member is formed by hydro-forming.

11. A front body structure for vehicle bodies as defined in claim 2, wherein said instrument panel member is formed by hydro-forming.

* * * * *